Nov. 12, 1940.   J. W. DAWSON   2,221,576
WELDING SYSTEM
Filed Aug. 13, 1938   3 Sheets-Sheet 1

WITNESSES:

INVENTOR
John W. Dawson.
BY
ATTORNEY

Nov. 12, 1940. J. W. DAWSON 2,221,576
WELDING SYSTEM
Filed Aug. 13, 1938 3 Sheets-Sheet 2

WITNESSES:

INVENTOR
John W. Dawson
BY
F. W. Lyle.
ATTORNEY

Nov. 12, 1940.   J. W. DAWSON   2,221,576
WELDING SYSTEM
Filed Aug. 13, 1938   3 Sheets-Sheet 3

WITNESSES:   INVENTOR
E. E. Riding.   John W. Dawson.
R. W. Bailey   BY F. W. Lyle.
ATTORNEY Patented Nov. 12, 1940

2,221,576

UNITED STATES PATENT OFFICE 2,221,576

WELDING SYSTEM

John W. Dawson, Auburndale, Mass., assignor to Westinghouse Electric & Manufacturing Company, East Pittsburgh, Pa., a corporation of Pennsylvania Application August 13, 1938, Serial No. 224,709

5 Claims. (Cl. 219—4)

My invention relates to a welding system and especially a welding system employing long leads carrying heavy currents.

An object of my invention is to utilize a contact rectifier in supplying the welding current directly to the welding electrodes.

Another object of my invention is to improve the power factor and lower the kva. rating of the transformer supplying current to welding electrodes having long leads.

A further object of my invention is to provide a welding system which shall be capable of drawing power from a polyphase network distributing the loading uniformly over all of the phases.

A still further object of my invention is to provide a welding arrangement which, while sup-supplied from an alternating source, shall be capable of delivering direct current for welding.

Other objects and advantages of my invention will be apparent from the following description and drawings, in which.

Certain types of welders necessarily employ long leads, and these leads carry heavy currents. This is especially true of the "gun" type portable spot welders. These long leads from the secondary of the transformer carry heavy currents and the power factor is very poor, and the kva. rating of the transformer is correspondingly high. I have devised a scheme whereby apparatus is utilized employing low voltage and high current in the secondary of the welding transformer, so that the welding leads operate at the frequency of the welding spots instead of at the frequency of the line commercial voltage. In my preferred embodiment, I accomplish this result by utilizing a very large rectifier, preferably of the copper oxide type, in the secondary circuit of the welding transformer to supply rectified current to the welding electrodes.

It is to be noted, moreover, that for certain welding operations as, for example, with certain forms of aluminum, direct current is to be preferred to alternating current.

Figure 1:
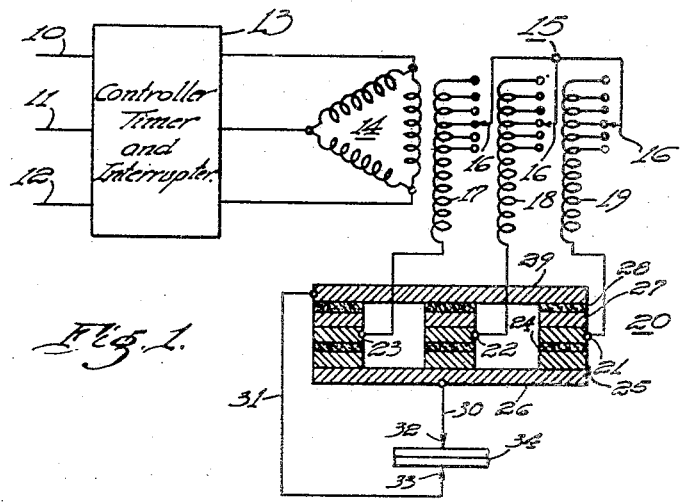
Figure 1 is a diagrammatic circuit illustrating a preferred embodiment of my invention.
Figure 3:
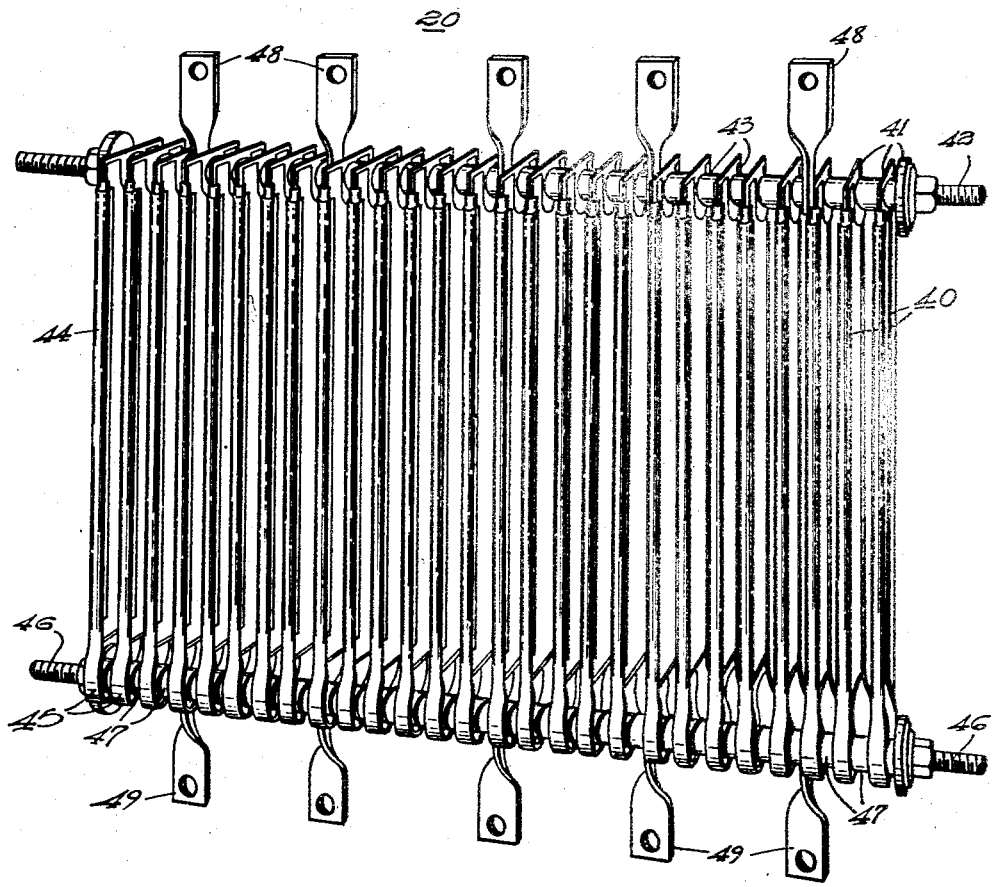
Fig. 3 is a perspective view of a row of contact rectifier plates in the structure of Fig. 2.
Figure 4:
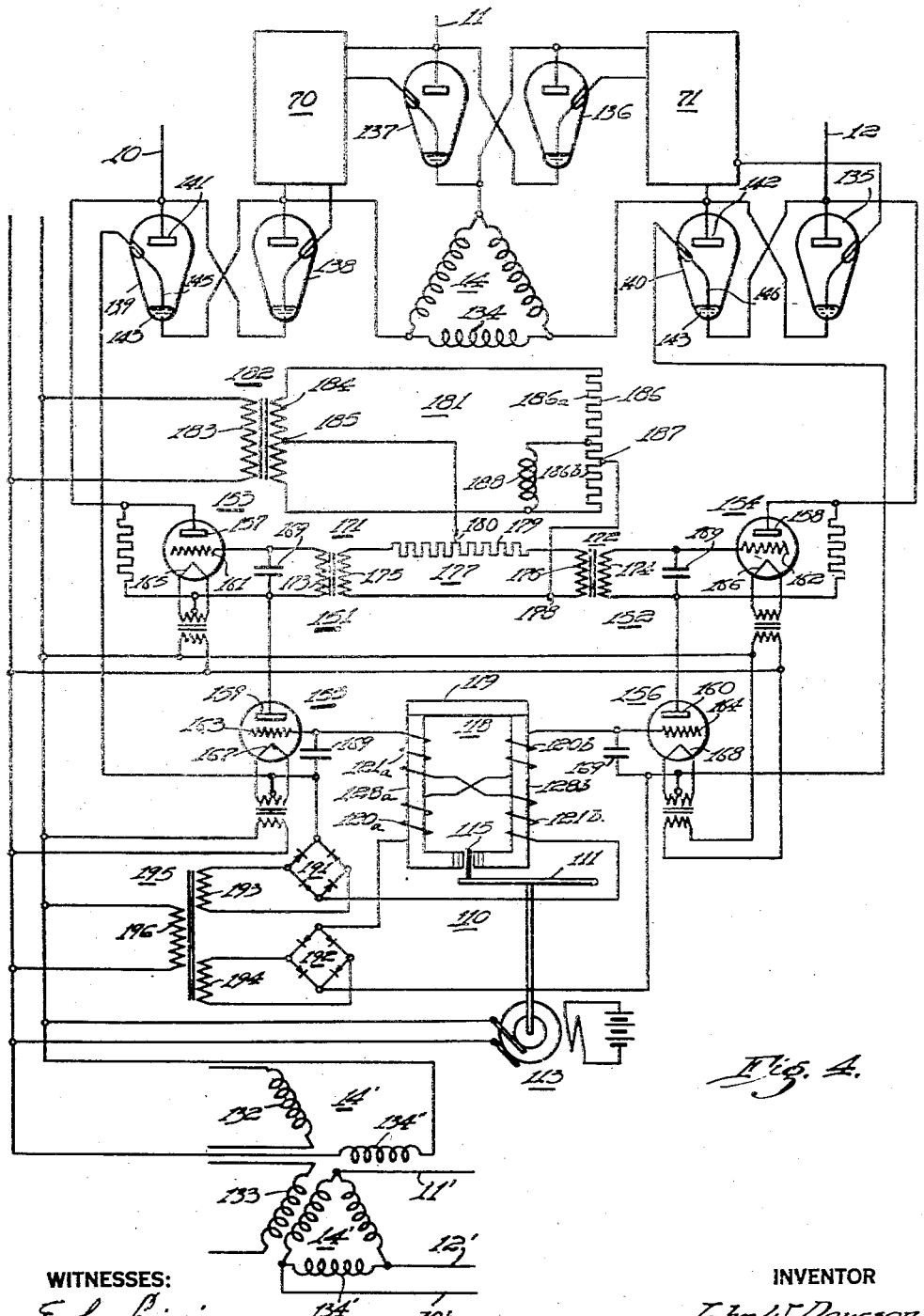
Fig. 4 is a diagrammatic circuit illustrating a preferred controller, timer and interrupter for the circuit in Fig. 1.

In Fig. 1, I have disclosed a three-phase supply circuit 10, 11 and 12 feeding into a controller timer and interrupter 13, which may be of any suitable type, and preferably that disclosed in Fig. 4. The three-phase current feeds into the delta transformer primary 14 to supply energy to the three-phase star-connected secondary 15. The secondary 15 has its legs tapped as at 16 for adjustment. The transformer 14 and 15 is preferably designed to transform alternating current at 60 volts into current at 6 volts. The value of the current in the secondary is raised up to the other of 10,000 or 20,000 or 30,000 amperes, or more. The three legs 17, 18 and 19 of the secondary 15 are connected to a large multi-plate contact rectifier 20, preferably of the copper oxide type. This copper oxide rectifier is diagrammatically illustrated in Fig. 1 and in perspective in Fig. 2. A detailed view of one of the series of plates is illustrated in Fig. 3. The three legs 17, 18 and 19 make connections to the junctures 21, 22 and 23 between the two series of plates. On one side, these contacts are to the copper oxide surface 24 of the rectifier plates, whose copper surface 25 underneath the oxide makes contact with the positive bus bar 26. The contacts 21, 22 and 23 on the other side make contact to the copper 27 of a series of plates whose copper oxide 28 is connected to the negative bus bar 29. A connection 30 from the positive bus bar and the connection 31 from the negative bus bar makes contact with the welding electrodes 32 and 33. The welding load 34, to which these electrodes may be applied, is, of course, of any type and especially of a type demanding a heavy current at low voltage.

Figure 2:
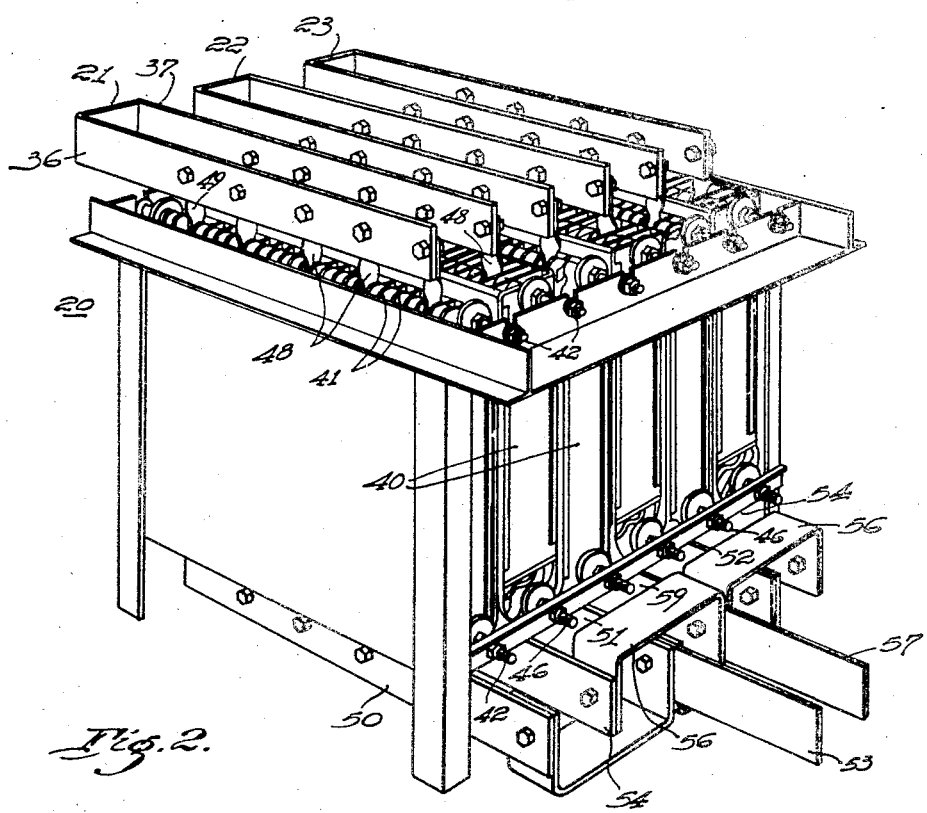
Fig. 2 is a perspective view of a contact rectifier utilized in the circuit of Fig. 1.

In Fig. 2 is illustrated a preferred structure of the copper oxide rectifier. The connections for the three-phase alternating current are respectively applied to the metal portion of U-shaped copper bars 21, 22 and 23. These copper bars have their parallel legs 36 and 37 connected to a series of plates whose preferred arrangement is disclosed in Fig. 3. The plates 40 are preferably of the oblong shape illustrated, coated with copper oxide except for the upper portion 41 surrounding a hole through which extends a rod 42. Contact is made to the exposed copper and to the exposed copper of the adjacent plates by conducting washers 43 on the rod 42 between the plates. The lateral edges of the copper oxide coated portion of the plates have clamped thereon a U-shaped edge piece 44 having an extensive linear contact with the copper oxide. These U-shaped straps extend into an integral loop or extension 45 at the other end of the rectangular plates making a contact to a rod 46 having thereon conducting washers 47 making contact to adjacent extensions of the straps 45. A plurality of thick copper tabs 48 extend from spaced intervals along the rod 42 and likewise thick copper tabs 49 extend from spaced intervals along the rod 46. The copper bus bar 36 in Fig. 2 is connected by the tabs 49, as shown, to the copper oxide portion of a line of these copper oxide discs. The other adjacent arm 37 of the bus bar is connected by the tabs 48 to the copper portion of the copper oxide disc. The lower portion or coil of the first row of plates is connected by the tabs to a bus bar 50 that is connected in turn to the copper end of the first plates of the other two legs 51 and 52 to form a common positive bus bar 53 corresponding to the bus bar 26 diagrammatically illustrated in Fig. 1. The lower portion of the respective other three groups of plates have bars 54 connected through rods 46 to the copper oxide portion of the plates and also to interconnections 56 to a common negative bus bar 57 corresponding to the bus bar 29 in Fig. 1. The plates are spaced apart so that they can be cooled by forced ventilation passed therethrough. The plates are also of such a size as to suitably rectify tens of thousands of amperes such as 10,000, 20,000 or 30,000.

In Fig. 4, I have disclosed a preferred timing circuit to substitute at 13 in the diagrammatic circuit of Fig. 1. Various types of timing circuits might be utilized, but I prefer to utilize the special adaptation of a circuit described in my Patent No. 2,081,987, issued June 1, 1937, for Electric control system. In Fig. 4, the multiphase connections 10, 11 and 12 are illustrated, as well as the delta primary 14 of Fig. 1.

In order to provide for the flow of alternating current under control to and from the delta primary 14, I utilize a plurality of discharge devices 135, 136, 137, 138, 139 and 140 illustrated. These six discharge devices are associated in pairs with each of the connections 10, 11 and 12. Each pair is inversely connected as disclosed. It is necessary for a positive half cycle of alternating current, for example, to enter one of the connections, pass through a leg of the primary 14, and return by one of the other multi-phase connections. The timing circuit illustrated is accordingly designed to permit such a wave to enter by multi-phase connection 10, for example, pass through the discharge device 139, pass through the leg 134, for example, of the primary 14, and then pass through the discharge device 140 and returned by the multi-phase connection 12. The timing circuit illustrated will permit the accurate starting and length of such passage by the timing circuit illustrated. Duplicates of this timing circuit may be applied at 70 and 71 to permit accurate timing of the passage of current through other combinations of the discharge devices and phases. The energy for the timing circuit is derived from a source such as the primary 14' in phase with the voltage through the main supply transformer 14. This may be done by connecting 10', 11', 12' to 10, 11 and 12. Primary 14' supplies energy to secondary 14" which in turn supplies the various rectifiers, cathodes and transformers of the timing circuit. 134, 134' and 134" are in phase. Secondaries 132 and 133 supply energy to timing circuits 70 and 71.

The following is a description of the timing circuit as applied between the multi-phase connections 10 and 12: Each of the valves 139, 140 has, respectively, anodes 141, 142, mercury pool cathodes 143, and control electrodes 145, 146. When current is caused to flow from the anodes 141, 142 through the control electrodes 145, 146 into the mercury pool cathodes 143, cathode spots are formed on the latter which will cause the valves 139 and 140 to become conducting when thus ignited, provided that the proper polarity for which they are adapted to be conducting is applied thereto. In other words, each of the valves 139, 140 will become conducting on the application of the proper polarity or half cycle thereto provided that the cathode spot is formed in the half cycle for which either of them is adapted to become conducting. The valves 139, 140 will remain in the conducting state until the end of the half cycle and will not again become conducting, unless during a succeeding half cycle of the alternating current, a cathode spot is again formed.

In order to energize the control electrodes 145, 146 for the purpose of forming the cathode spots in the valves 139, 140, control circuits shown generally at 151, 152 individual respectively thereto are provided. The circuits 151, 152 comprise electric valves 153, 154, respectively, which are controlled by means of a phase shifting circuit and valves 155, 156, which are disposed to be controlled by the timer device 110 employing a magnetic impulsing device 118, which is more particularly described in my Patent No. 2,081,987 referred to above.

The disk 111 is revolved at one revolution per second by the synchronous motor 113. The disk 111 has 120 holes in its peripheral region for use with 60 cycle alternating current so each hole corresponds to a half cycle. For the half cycles it is desired that the devices shall pass current to the primary 14, pins 115 are inserted in the holes. A composite core of permanent magnets 119 has laminations 120a and 120b surrounded by control windings 120a, 120b, 121a and 121b to control the tubes 155 and 156 as disclosed. If four pins are placed in consecutive openings, four increases and decreases of magnetic flux across the gap will occur with four consecutive impulses applied to valves 155 and 156 to conduct current for four half cycles. Where there are no pins in the holes there will be no impulses and no discharge through 155 and 156.

The valves 153, 154, 155, 156 are preferably of the gas-filled arc discharge type, and, as illustrated, they are, respectively, provided with anodes 157, 158, 159, 160, control electrodes or grids 161, 162, 163, 164, and hot cathodes 165, 166, 167, 168. A capacitor 169 is connected between each of the control electrodes 161, 162, 163, 164 and its respective cathode 165, 166, 167, 168, in order to maintain the former at a predetermined potential relative to the latter.

The valves 153, 154 are arranged to control the particular instant in each half cycle at which the valves 139, 140 are to be rendered conducting. Each of the valves 153, 154 has an individual transformer 171, 172, the secondary windings 173, 174 of which are connected, respectively, between the control electrode 161 and the cathode 165 and the control electrode 162 and the cathode 166. The transformers 171, 172 are provided, respectively, with primary windings 175, 176 which are connected into a common control circuit 177 having a common terminal 178 and a voltage divider 179 provided with a variable tap 180. The voltage divider 179 and the variable tap 180 therealong is provided in order to control the relative time in each half cycle at which the valves 153, 154 are rendered conducting. Due to slight variations in manufacture, the valves 153, 154 and the associated valves may not have identical operating characteristics. In order, therefore, to provide for making a compensation for different operating characteristics of the valves 153, 154, the voltage divider 179 may be adjusted by moving the variable tap 180 to the desired position.

The time in each half cycle at which the valves 153, 154 are rendered operative depends upon the phase relationship of the voltage which is impressed between the common terminal 178 and the variable tap 180 relative to the voltage in the legs 134, 134' and 134" of transformers 14, 14', which leg voltages are in phase. This relative phase relationship may be altered in order to vary the amount of energy which is supplied to the load device or the heat supplied to perform a welding operation, by rendering the valves 139, 140 conducting either earlier or later in their individual half cycles to correspondingly increase or decrease the amount of energy which is supplied to the load device. The desired phase relationship of the control voltage for the valves 153, 154 may be obtained from a phase shifting circuit, shown generally at 181. The phase shifting circuit 181 is energized by means of a transformer, shown generally at 182, having a primary winding 183 connected to transformer 14', and a secondary winding 184 having a tap 185 which may be located midway between the terminals thereof. A voltage divider 186 is provided comprising sections 186a, 186b, and having a variable tap 187 movable therealong. An inductor 188 is provided and connected in shunt circuit relation with the section 186b. It will be observed that two impedances are provided by this impedance network. That is, the impedance represented by the section 186a of the voltage divider 186 and the impedance having a different phase angle represented by the section 186b of the voltage divider 186 and the inductor 188 connected in shunt circuit relation therewith.

It will also be observed that the variable tap 180 of the voltage divider 179 is connected to the tap 185 of the secondary winding 184 and that the common terminal 178 is connected to the variable tap 187. By adjusting the position of the variable tap 187 along the voltage divider 186, it is possible to vary the phase relation of the voltage applied between the common terminal 178 and the variable tap 180 of the common control circuit 177 as may be desired.

The control voltage of substantially constant magnitude is obtained by connecting the common control circuit 177 between a point of the tap 185 and the variable tap 187. In this manner, it is possible to provide a substantial constant value of control voltage over the entire portion of each half cycle during which it may be desirable to render the valves 139, 140 conducting.

The timer 118 is provided to determine the particular half cycles during which the valves 139, 140 will be rendered conducting. It will be observed that the control windings 121a, 121b of the magnetic impulsing device 118 are connected in series circuit relation and to the control electrode 163 of the valve 155, and that the windings 120a, 120b of this device are also connected in series circuit relation and to the control electrode 164. Normally, a negative biasing potential is applied to the electrode 163, 164 by means of rectifiers 191, 192, respectively. The rectifiers 191, 192 may be connected for energization, respectively, to secondary windings 193, 194 of a transformer, shown generally at 195, having a primary winding 196 which may be connected to the secondary of transformer 14'.

The adjustment of this circuit will determine the number of cycles of alternating current that will pass from multi-phase connection 10 to multi-phase connection 12 through the primary 14.

I have accordingly devised a system for utilizing very low voltage and high current energy in the secondary of the welding transformer. It is apparent that many modifications may be made in the preferred embodiment illustrated. In particular, it is to be noted that my invention may be applied where the source is of the single-phase type or has any number of phases other than three as actually shown. Accordingly, I desire only such limitations imposed on the following claims as is necessitated by the prior art.

I claim as my invention:

1. A resistance welding circuit comprising a source of alternating current, a transformer having its primary connected to said source, a timing mechanism interposed between said source and said transformer automatically controlling the number of cycles of alternating current applied to said transformer at a time, a contact rectifier connected in the secondary of said transformer and welding electrodes connected to said contact rectifier.

2. A resistance welding circuit comprising a source of alternating current, a transformer having its primary connected to said source, a timing mechanism interposed between said source and said transformer automatically controlling the number of cycles of alternating current applied to said transformer, a contact rectifier being connected to the secondary of said transformer, said contact rectifier comprising a plurality of copper oxide coated copper plates and welding electrodes connected to said contact rectifier.

3. A welding circuit comprising welding electrodes, connections thereto, a contact rectifier and means for connecting a source of alternating current to said contact rectifier and for connecting said rectifier to said connections to supply output current from said rectifier thereto, the voltage in said connections to the welding electrodes being of the order of 2 to 20 volts and the current being of the order of ten thousand amperes in operation.

4. A resistance welding circuit comprising welding electrodes adapted to be placed in contact with a welding load, multi-phase connections for supplying multi-phase alternating current, a rectifier drawing a balanced supply from the various multi-phase connections and supplying its output current to said welding electrodes, and a timing mechanism controlling the number of cycles of alternating current applied consecutively to said rectifier.

5. A resistance welding circuit comprising welding electrodes adapted to be placed in contact with a welding load, multi-phase connections for supplying multi-phase alternating current, a copper oxide rectifier drawing a balanced supply from the various multi-phase connections and supplying its output current to said welding electrodes, and a timing mechanism controlling the number of cycles of alternating current applied at a time to said rectifier.

JOHN W. DAWSON.